(12) United States Patent
Bürkert et al.

(10) Patent No.: US 11,831,266 B2
(45) Date of Patent: Nov. 28, 2023

(54) SYSTEM COMPRISING COMPONENT CODING

(71) Applicant: ebm-papst Mulfingen GmbH & Co. KG, Mulfingen (DE)

(72) Inventors: Martin Bürkert, Dörzbach-Hohebach (DE); Steffen Kammleiter, Assamstadt (DE); Sebastian Schroth, Kupferzell (DE); Alex Schneider, Künzelsau (DE); Marco Weckert, Bad Mergentheim (DE)

(73) Assignee: ebm-papst Mulfingen GmbH & Co. KG, Mulfingen (DE)

(*) Notice: Subject to any disclaimer, the term of this patent is extended or adjusted under 35 U.S.C. 154(b) by 92 days.

(21) Appl. No.: 17/432,608

(22) PCT Filed: Apr. 21, 2020

(86) PCT No.: PCT/EP2020/061057
§ 371 (c)(1),
(2) Date: Aug. 20, 2021

(87) PCT Pub. No.: WO2020/239326
PCT Pub. Date: Dec. 3, 2020

(65) Prior Publication Data
US 2022/0200510 A1     Jun. 23, 2022

(30) Foreign Application Priority Data
May 27, 2019 (DE) .......................... 1020191140587

(51) Int. Cl.
*H02P 29/032* (2016.01)
*H02P 5/00* (2016.01)
*H02P 29/024* (2016.01)

(52) U.S. Cl.
CPC .............. *H02P 29/027* (2013.01); *H02P 5/00* (2013.01)

(58) Field of Classification Search
CPC ......... H02P 29/027; H02P 5/00; H02P 29/032
See application file for complete search history.

(56) References Cited

U.S. PATENT DOCUMENTS

| | | | | |
|---|---|---|---|---|
| 4,289,997 A * | 9/1981 | Jung | .......................... | H02P 5/00 318/113 |
| 6,211,639 B1 * | 4/2001 | Meister | .............. | G05B 19/0421 318/625 |

(Continued)

FOREIGN PATENT DOCUMENTS

| | | |
|---|---|---|
| DE | 29620516 U1 | 1/1997 |
| EP | 0304574 A1 | 3/1989 |
| EP | 1246345 A1 | 10/2002 |

OTHER PUBLICATIONS

International Search Report and Written Opinion of the International Searching Authority, issued in PCT/EP2020/061057, dated Jul. 24, 2020; ISA/EP.

(Continued)

*Primary Examiner* — Thai T Dinh
(74) *Attorney, Agent, or Firm* — Harness, Dickey & Pierce, P.L.C.

(57) ABSTRACT

A system (1) has a control device (10) with central electronics (11) designed for connection and operation of differently coded electric motors (En), with different motor characteristics (Mn) and/or power classes (Ln), to a device connection (12) of the control device (10). The at least one electric motor (En) is selectable from a number (n) of electric motor (En), that can be connected as intended, has a coding element (Kn). The central electronics (11) have a coding capture device (2) to recognize, via coding element (n), the motor characteristics (Mn) and/or the power class (Continued)

(Ln) of the respective currently connected electric motor (En).

16 Claims, 2 Drawing Sheets

(56) References Cited

U.S. PATENT DOCUMENTS

| | | | |
|---|---|---|---|
| 6,555,984 B1 | 4/2003 | Rajala et al. | |
| 7,602,132 B2 * | 10/2009 | Davis | H02P 23/0077 318/565 |
| 11,404,975 B2 * | 8/2022 | Krause-Leipoldt | H02P 6/04 |
| 2020/0228033 A1 * | 7/2020 | Huo | H02P 21/18 |

OTHER PUBLICATIONS

European Office Action dated Jun. 30, 2023 in corresponding European Application No. 20721180.6.

* cited by examiner

SYSTEM COMPRISING COMPONENT CODING

CROSS-REFERENCE TO RELATED APPLICATIONS

This application is a 371 U.S. National Phase of International Application No. PCT/EP2020/061057, filed Apr. 21, 2020, which claims priority to German Patent Application No. 10 2019 114 058.7, filed May 27, 2019. The entire disclosures of the above applications are incorporated herein by reference.

FIELD

The disclosure relates to a system with central electronics designed for the intended connection and operation of differently coded electric motors selectable from a number of electric motors with different motor characteristics or power classes that can be connected as intended.

SUMMARY

In practice, there is a need to connect different motors or fans of different power classes to central or decentralized electronics that handle the commutation and monitoring of several motors of different types in different system configurations. The problem here is that, depending on the application case, a fan or motor with a different power class or different motor characteristics must be connected to the interface of the central electronics. However, and the electronics cannot easily detect the different motor types. In the final development stage, the electric motors may be implemented as fans, pumps, stepper motors, and compressors.

This problem is overcome in different, sometimes very complex ways in the prior art. There are already solutions where mechanical coding or electrical circuits are used accordingly to bring about a certain circuit state according to counter-coding.

Thus, in the prior art, the connected devices are also detected via identification of the add-on components. This takes place via the determination of electric parameter variables such as, for example, the resistance and the inductance value or by means of a certain identifying signal sequence of an active element.

If such central electronics are also required for overload protection and commutation of several motors, which are different in terms of electrical parameters and thus also in terms of power limits, the monitoring circuitry range on the electronics must be adapted in terms of the switch-off threshold of the current amplitude. However, this is not easily accomplished with the solutions known in the prior art.

The known solutions cause high management costs due to the resulting variant variety in the final device design as a result of necessary equipment options on the electronics side and circuit board, which are dependent on the power class and characteristics. In order to implement overload protection, complex, device-specific adaptations to the electronics are necessary because of the equipment variation in an evaluation circuit. Furthermore, there are high demands placed on an evaluation of a detection means via the software (class B), and typically mapping tables are required to execute follow-up actions or functions as a function of resistance values in the evaluation system.

Thus, it is an object of the disclosure to overcome the aforementioned disadvantages. The disclosure proposes a solution that will enable a motor-specific adaptation of over-current protection, in addition to the possibility of a variable connection option of various motors of different power classes.

This object is achieved by the combination of features according to a system comprising a control device with central electronics designed for an intended connection and operation of differently coded electric motors ($En$) with different motor characteristics ($mn$) and/or power classes ($Ln$) to a device connection of the Control Device. At least one electric motor ($En$) selectable from a number of electric motors ($En$) that can be connected as intended. Each electric motor ($En$) that can be connected as intended has a coding element ($Kn$). The central electronics have a coding capture device for recognizing, via the coding element ($Kn$), the motor characteristics ($Mn$) and/or the power class ($Ln$) of the respectively currently connected electric motor ($En$).

The basic idea of the present disclosure is to split the total protection circuit. The primary protection circuit, in which the primary protection circuit is implemented in the central electronics. Thus this represents the fixed component in the protective design of the protection circuit. A respectively individual auxiliary protection circuit, that is preferably implemented by means of a passive component in the form of a coding element, such as by an electrical resistor, is incorporated into the unit to be commutated in terms of its task to determine the switch-off value. Such an auxiliary protection circuit is integrated into the connection plug or the motor connection line of the electric motor, such as the fan or the pump.

To this end, a system is proposed according to the disclosure comprising a control device with central electronics designed for the intended connection and operation of differently coded electric motors with different motor characteristics and/or power classes to a device connection of the control device and at least one electric motor selectable from a number n of electric motors which can be connected as intended. Each electric motor that can be connected as intended has a coding element. The central electronics have an electronic coding capture device to recognize the motor characteristics and/or the power class of the respectively currently connected electric motor by its coding element.

In a preferred embodiment of the system according to the disclosure, each electric motor has a motor connection line with a connection plug for plugging into the device connection of the control device. The respective coding element is integrated into the motor connection line or the connection plug.

It is further advantageous when the respective coding element comprises or is at least one electric structural element that is specific for the respective motor type, such as an electrical resistor.

To ensure that the required current-limiting thresholds are adjusted correctly for self-configurable overload protection for the respective electric motor, the coding element is integrated into the motor connection. Thus, once the connection plug is plugged into the device socket of the central electronics, a connection that is closed for the signal flow is established between the coding element and the evaluation circuit of the central electronics which is used for the electric motor. The coding element, which differs in terms of its characteristics as a function of the power class or motor characteristics, may be attached, for example, a clamp or solder connection. Preferably, the coding element is closed off to contact with an insulating element and connected to the contact of the connection plug with the connection line.

In a further preferred embodiment of the system, the coding capture device on the central electronics comprises an electrical evaluation circuit. The electrical evaluation circuit is designed to use a motor-specific current limit as a function of the electric motor connected or the coding element detected for this motor.

It is further advantageous when the coding capture device has a current-limiting circuit which uses a current limit as a function of the detected coding element. The current limit prevents over-current above the current limit and enables a maximum current up to this value. Thus, depending on the respectively connected electric motor or fan, it can be ensured, in a simple manner, that the correct motor-specific current limit is automatically active for that motor.

In a likewise preferred embodiment of the system, the current limit for a connected electric motor is implemented in that signal contacts of the coding capture device are incorporated into a signal flow loop via at least one line connection having the coding element. And a corresponding switch-off threshold is set by means of a comparator of the protection circuit of the primary protection circuit.

In this manner, an over-current protection device is implemented comprising at least the central electronics and an electric motor with a primary protection circuit and an auxiliary protection circuit. The primary protection circuit has at least one evaluation circuit for evaluating a coding element and is implemented in the central electronics. The auxiliary protection circuit is implemented separately in the motor connection line or a connection plug connected to the line. The connection plug has a coding element.

In other words, a closed protection circuit connection is established between the auxiliary protection circuit and the primary protection circuit due to the motor connection plug being plugged into the central electronics. The idea of the disclosure can be especially efficiently used in EC motors that can be commutated with commutation of the central electronics. Further preferably, the idea of the disclosure is provided for electric motors that can be connected as intended. Each motor represents an integral drive of a device, particularly of a fan, a pump, a compressor, or an HVAC device.

Other advantageous further embodiments of the disclosure are characterized in the dependent claims and/or are shown in more detail in the following by means of the figures, along with the description of the preferred embodiment of the disclosure.

DRAWINGS

The drawings described herein are for illustrative purposes only of selected embodiments and not all possible implementations, and are not intended to limit the scope of the present disclosure.

The following is shown:

DETAILED DESCRIPTION

Figure 1:
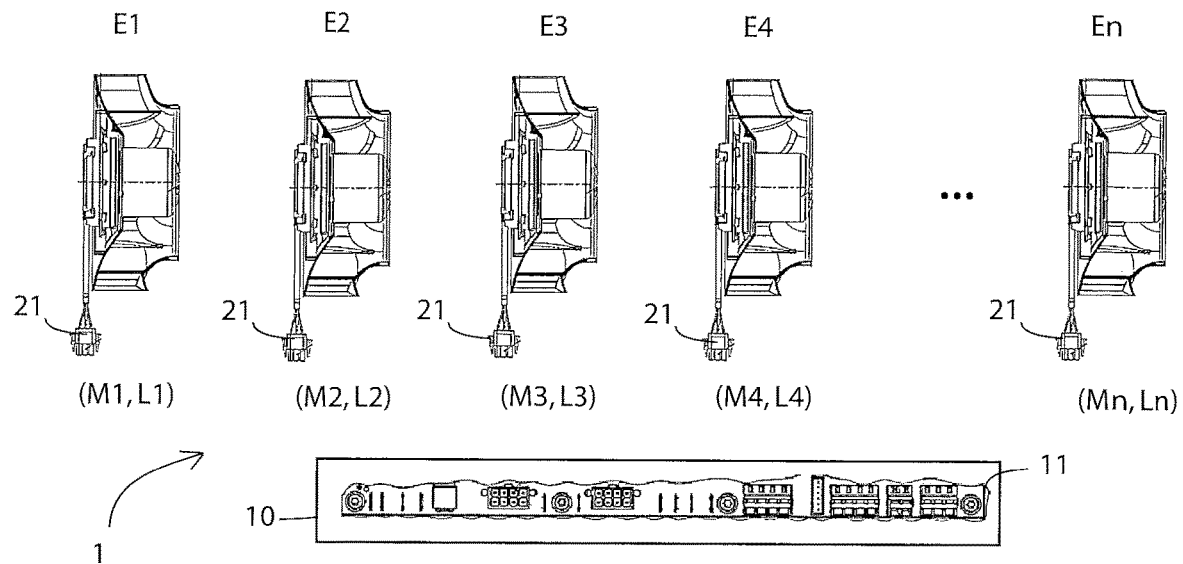
FIG. 1 is a schematic view of an exemplary embodiment of a system.

The disclosure is explained in more detail in the following with reference to FIGS. 1 to 4. The use of the same reference numerals indicates the same structural and/or functional features.

FIG. 1 is a schematic overview of an exemplary embodiment of a system 1 according to the disclosure. The shown system 1 has at least one pairing including the control device 10, with the central electronics 11, and one of the electric motors En. The motor En is selectable from the shown number n of differently coded electric motors E1 to En with different motor characteristics M1 to Mn and/or power classes L1 to Ln. The electric motors En each have a connection plug 21 to connect to a device connection 12 of the control device 10 of the central electronics 11.

Figure 2:
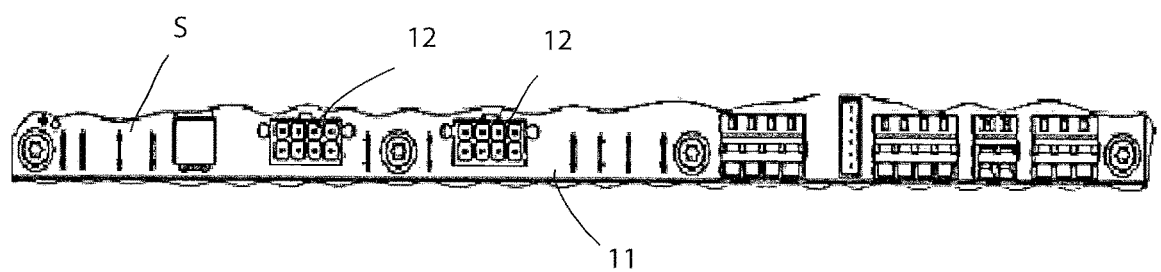
FIG. 2 is a schematic view of an interface of central electronics.

According to the disclosure, each of the electric motors En shown can thus be connected to the device connections 12 of the control device 10 of central electronics 11 without manual adaptation of the control, as shown in FIG. 2.

FIG. 2 shows a schematic view of an interface S of central electronics 11 with the two device connections 12 each for connecting one electric motor En. In addition, further interfaces are shown for establishing further connections to other devices.

Figure 4:
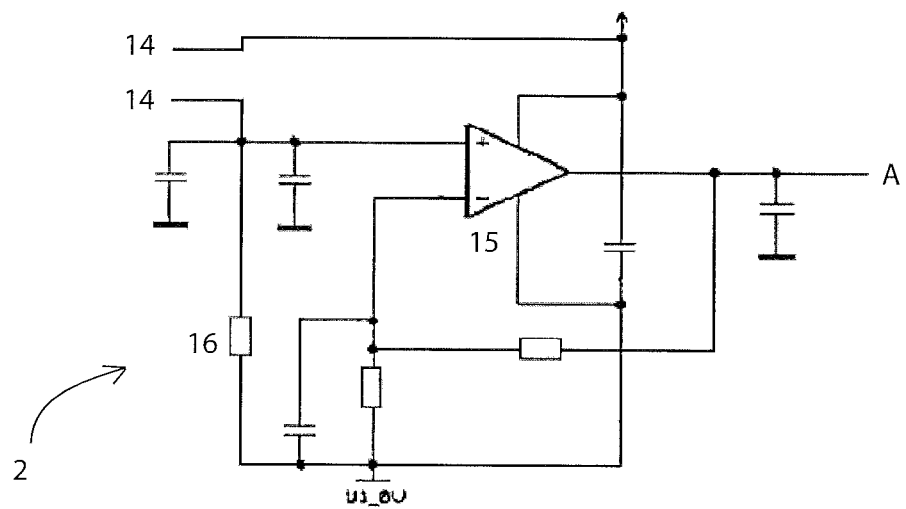
FIG. 4 is an evaluation circuit for determining the connected motor type.

The device connections 12 have at least two signal connections to connect to the signal contacts 14 of the coding capture device 2 that include the evaluation circuit which is shown in FIG. 4.

Using these signal contact connections 14, a line connection, with the coding element Kn of the connected electric motor En, is placed into a signal flow loop. A corresponding switch-off threshold is set for the power class of the electric motor En connected to the respective device connections 12 by the comparator 15.

After the connection of the connection plug 21 to the interface of the central electronics 11 in FIG. 2, the signal contact connections 14, that have been open-circuit until that point, are connected via the coding element Kn. The necessary switch-off threshold is set according to the fan type used for the comparator 15 with the assistance of the resistor 16. The output signal A of the evaluation circuit, according to FIG. 4, is used as an alternating signal for a safer switch-off of the commutation end stage.

Figure 3:
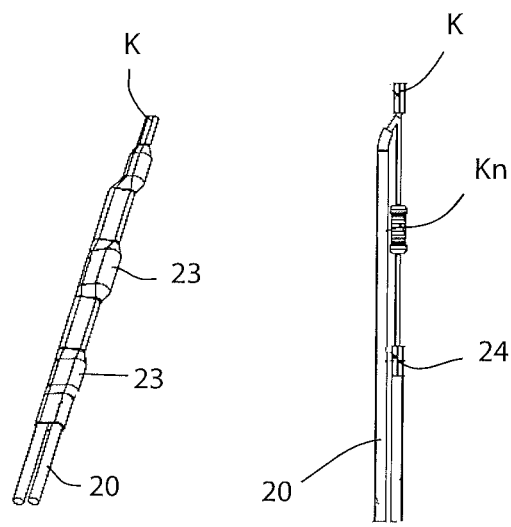
FIG. 3 is an exemplary coding element in a motor connection line.

FIG. 3 shows an exemplary implementation of a coding element Kn. Each of the electric motors E1 to En shown in FIG. 1, which can be connected as intended, has an individual (specific for this motor type) coding element Kn. The coding element Kn is integrated into the motor connection line 20. The two ends of the cable 20 are accommodated on the connection plug 21. An insulating element 23 is attached about the coding element Kn, as is schematically shown to the left in FIG. 3. The connection of the coding element Kn in this case can be established via one of the conventional connection techniques using, for example, a solder or insulation-displacement connection 24, that is likewise surrounded by an insulating element 23 to establish contact protection, where relevant regulations of low-voltage coordination are considered as relates to the design of the insulating element.

Using the evaluation circuit shown in FIG. 4, a motor-specific current limitation dependent on the connected electric motor En is implemented, which uses a current limitation specifically for this as a function of the detected coding element Kn, the current limitation preventing an over-current above the current limitation.

The disclosure is not limited in its design to the aforementioned preferred exemplary embodiments. Rather, a number of variants is conceivable, that would make use of the solution shown even with essentially different designs. As a further advantageous effect, the limit threshold can be set at "zero" in the event of a cable break in the connection line thus switching off the commutation stage. Furthermore, aging effects of the contact transitions have no significant impact on the device. In addition, no separate commutation electronics are necessary for the different components to be commutated, which components contain the auxiliary protection circuit.

The invention claimed is:

1. A system comprising
a control device with central electronics for connection and operation of differently coded electric motors with different motor characteristics and/or power classes to a device connection of the control device;
at least one electric motor selectable from a number of electric motors (En) that can be connected as intended;
each electric motor that can be connected as intended has a coding element;
the central electronics have a coding capture device for recognizing, via the coding element, the motor characteristics and/or the power class (Ln) of the respectively currently connected electric motor,
wherein a current limitation for the connected electric motor is implemented in that signal contacts of the coding capture device are incorporated into a signal flow loop via at least one line connection having the coding element, and a corresponding switch-off threshold is set by a comparator.

2. The system according to claim 1 wherein each electric motor has a motor connection line with a connection plug for plugging into the device connection of the control device, and the respective coding element is integrated into the motor connection line or the connection plug.

3. The system according to claim 1, wherein the coding element comprises or is at least one electric structural element.

4. The system according to claim 3, wherein the coding element comprises at least one electrical resistor or is an electrical resistor.

5. The system according to claim 1, wherein the coding capture device comprises an electrical evaluation circuit designed to use a motor-specific current limitation as a function of the connected electric motor.

6. The system according to claim 1, wherein the coding capture device has a current limitation circuit that uses the current limitation depending on the detected coding element, that prevents an over-current above the current limitation.

7. The system according to claim 1, wherein each electric motor (En) represents an electrically commutated (EC) motor that can be commutated through commutation of the central electronics.

8. The system according to claim 1, wherein each electric motor, that can be connected as intended, is an integral drive of a device, particularly of a fan, a pump, a compressor, or a heating ventilation and air conditioning (HVAC) device.

9. The system according to claim 1, wherein an over-current protection device of the system including at least the central electronics and the electric motor is formed from a primary protection circuit and an auxiliary protection circuit, the primary protection circuit has at least one evaluation circuit for evaluating the coding element (Kn) and is implemented in the central electronics, while the auxiliary protection circuit is implemented separately therefrom in the motor connection line or a connection plug connected to the line, the connection plug has the coding element.

10. A system comprising
a control device with central electronics for connection and operation of multiple differently coded electric motors with different motor characteristics and/or power classes to a device connection of the control device;
each of the electric motors having a coding element;
the central electronics have a coding capture device for recognizing, via the coding element, the motor characteristics and/or the power class (Ln) of the respectively currently connected electric motor,
wherein each of the electric motors has a motor connection line with a connection plug for plugging into a device connection of the control device, and the respective coding element is integrated into the motor connection line or the connection plug,
wherein the coding capture device has a current limitation circuit that uses a current limitation depending on the detected coding element, that prevents an over-current above the current limitation, and
wherein the current limitation for the connected electric motor is implemented in that signal contacts of the coding capture device are incorporated into a signal flow loop via at least one line connection having the coding element, and a corresponding switch-off threshold is set by a comparator.

11. The system according to claim 10, wherein the coding element comprises or is at least one electric structural element.

12. The system according to claim 11, wherein the coding element comprises at least one electrical resistor or is an electrical resistor.

13. The system according to claim 10, wherein the coding capture device comprises an electrical evaluation circuit designed to use a motor-specific current limitation as a function of the connected electric motor.

14. The system according to claim 10, wherein each electric motor (En) represents an electrically commutated (EC) motor that can be commutated through commutation of the central electronics.

15. The system according to claim 10, wherein each electric motor, that can be connected as intended, is an integral drive of a device, particularly of a fan, a pump, a compressor, or a heating ventilation and air conditioning an HVAC device.

16. The system according to claim 10, wherein an over-current protection device of the system including at least the central electronics and the electric motor is formed from a primary protection circuit and an auxiliary protection circuit, the primary protection circuit has at least one evaluation circuit for evaluating the coding element (Kn) and is implemented in the central electronics, while the auxiliary protection circuit is implemented separately therefrom in the motor connection line or a connection plug connected to the line, the connection plug has the coding element.

* * * * *